United States Patent
Okahisa et al.

(10) Patent No.: US 9,764,483 B2
(45) Date of Patent: Sep. 19, 2017

(54) ROBOT AND MANUFACTURING METHOD OF THE SAME

(71) Applicant: KABUSHIKI KAISHA YASKAWA DENKI, Kitakyushu-shi (JP)

(72) Inventors: Manabu Okahisa, Fukuoka (JP); Takahiko Kanamori, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/340,494

(22) Filed: Jul. 24, 2014

(65) Prior Publication Data

US 2015/0027262 A1   Jan. 29, 2015

(30) Foreign Application Priority Data

Jul. 26, 2013  (JP) .................................. 2013-156047

(51) Int. Cl.
| | |
|---|---|
| *B25J 17/02* | (2006.01) |
| *B25J 18/00* | (2006.01) |
| *B25J 19/00* | (2006.01) |

(52) U.S. Cl.
CPC ........... *B25J 18/00* (2013.01); *B25J 19/0025* (2013.01); *Y10S 901/27* (2013.01); *Y10T 29/49174* (2015.01); *Y10T 74/20311* (2015.01)

(58) Field of Classification Search
CPC ........... B25J 17/02; B25J 18/04; B25J 18/007
USPC .................................................... 901/28, 29
See application file for complete search history.

(56) References Cited

U.S. PATENT DOCUMENTS

| | | | | |
|---|---|---|---|---|
| 4,394,533 A | | 7/1983 | Naito | |
| 4,518,308 A | * | 5/1985 | Grzybowski | B25J 9/046 414/735 |
| 4,780,047 A | * | 10/1988 | Holt | B25J 3/04 414/730 |
| 4,973,215 A | * | 11/1990 | Karlen | B25J 9/04 414/729 |
| 5,046,375 A | * | 9/1991 | Salisbury, Jr. | B25J 9/046 414/7 |
| 5,155,423 A | * | 10/1992 | Karlen | B25J 9/04 318/568.1 |
| 5,437,207 A | * | 8/1995 | Zimmer | B23K 11/318 414/918 |

(Continued)

FOREIGN PATENT DOCUMENTS

| | | |
|---|---|---|
| DE | 10141407 | 10/2002 |
| EP | 1083030 | 3/2001 |

(Continued)

OTHER PUBLICATIONS

Chinese Office Action for corresponding CN Application No. 20140244697.7, Aug. 27, 2015.

(Continued)

*Primary Examiner* — Zakaria Elahmadi
(74) *Attorney, Agent, or Firm* — Mori & Ward, LLP

(57) ABSTRACT

A robot in an embodiment includes a robot body, an end effector, a cable, and one or more coupling portions. The end effector is connected to the robot body. The cable is composed of a plurality of sub cables, arranged along the robot body, and connected to the end effector. Each of the coupling portion is provided between one sub cable and an adjacent sub cable of the sub cables to couple the one and adjacent sub cables together.

9 Claims, 5 Drawing Sheets

(56) References Cited

U.S. PATENT DOCUMENTS

| | | | | |
|---|---|---|---|---|
| 5,784,542 | A * | 7/1998 | Ohm | B25J 3/04 700/247 |
| 6,288,512 | B1 * | 9/2001 | Berninger | B25J 19/0025 191/12 R |
| 6,394,998 | B1 | 5/2002 | Wallace et al. | |
| 6,408,710 | B1 * | 6/2002 | Kullborg | B25J 9/047 310/64 |
| 7,104,153 | B2 * | 9/2006 | Matsumoto | B25J 19/0029 74/490.01 |
| 7,322,258 | B2 * | 1/2008 | Shiraki | B25J 19/0025 74/490.02 |
| 7,540,214 | B2 * | 6/2009 | Iwai | B25J 19/0029 74/490.02 |
| 7,650,852 | B2 * | 1/2010 | Clifford | B05B 13/0431 118/305 |
| 8,347,753 | B2 * | 1/2013 | Larsson | B25J 19/0029 74/490.01 |
| 8,629,350 | B2 * | 1/2014 | Ljungkvist | B25J 9/0009 174/72 A |
| 8,631,720 | B2 * | 1/2014 | Nakagiri | B25J 19/0029 74/490.02 |
| 9,254,575 | B2 * | 2/2016 | Murakami | B25J 19/0025 |
| 2004/0200304 | A1 * | 10/2004 | Matsumoto | B25J 19/0029 74/490.02 |
| 2005/0011295 | A1 * | 1/2005 | Shiraki | B25J 19/0025 74/490.02 |
| 2005/0034552 | A1 * | 2/2005 | Back | B25J 19/0029 74/490.02 |
| 2006/0117896 | A1 | 6/2006 | Kidooka et al. | |
| 2006/0196300 | A1 | 9/2006 | Kidooka et al. | |
| 2009/0114052 | A1 | 5/2009 | Haniya et al. | |
| 2009/0139364 | A1 * | 6/2009 | Forslund | B25J 17/0283 74/490.06 |
| 2009/0224109 | A1 | 9/2009 | Hasunuma et al. | |
| 2010/0043587 | A1 | 2/2010 | Broberg et al. | |
| 2011/0010011 | A1 | 1/2011 | Oka et al. | |
| 2011/0252913 | A1 | 10/2011 | Ibayashi et al. | |
| 2011/0252914 | A1 | 10/2011 | Ibayashi et al. | |
| 2012/0067157 | A1 * | 3/2012 | Suzuki | B25J 19/0025 74/490.02 |
| 2012/0111135 | A1 | 5/2012 | Ichibangase et al. | |
| 2013/0098190 | A1 * | 4/2013 | Pan | B25J 19/0025 74/490.02 |
| 2013/0168505 | A1 | 7/2013 | Ljungkvist | |
| 2013/0305869 | A1 * | 11/2013 | Krumbacher | B25J 17/02 74/490.06 |
| 2013/0306603 | A1 | 11/2013 | Ferrero et al. | |
| 2014/0030032 | A1 | 1/2014 | Kuhn | |
| 2014/0083229 | A1 * | 3/2014 | Kume | B25J 19/0025 74/490.02 |
| 2014/0103168 | A1 | 4/2014 | Kume | |
| 2014/0109712 | A1 | 4/2014 | Ono | |
| 2014/0130631 | A1 | 5/2014 | Kume | |
| 2014/0137685 | A1 | 5/2014 | Iwayama | |
| 2014/0196563 | A1 | 7/2014 | Takahashi et al. | |
| 2014/0290415 | A1 | 10/2014 | Hasuo | |
| 2015/0007681 | A1 | 1/2015 | Murakami | |
| 2015/0034698 | A1 | 2/2015 | Takahashi et al. | |
| 2015/0039125 | A1 | 2/2015 | Takahashi et al. | |
| 2015/0059511 | A1 | 3/2015 | Mushikami et al. | |
| 2015/0114162 | A1 * | 4/2015 | Kirihara | B25J 19/0029 74/490.02 |

FOREIGN PATENT DOCUMENTS

| | | |
|---|---|---|
| EP | 1243384 | 9/2002 |
| EP | 1352721 | 10/2003 |
| EP | 2450158 | 5/2012 |
| EP | 2551068 | 1/2013 |
| EP | 2829368 | 1/2015 |
| EP | 2829369 | 1/2015 |
| JP | 59-169687 | 9/1984 |
| JP | 62-199380 | 9/1987 |
| JP | 1-118882 U | 8/1989 |
| JP | 02-124694 U | 10/1990 |
| JP | 6-508303 A | 9/1994 |
| JP | 09-32531 | 2/1997 |
| JP | 2004-299002 A | 10/2004 |
| JP | 2005-288560 | 10/2005 |
| JP | 2006-102859 | 4/2006 |
| JP | 2008-136925 | 6/2008 |
| JP | 5151513 B2 | 8/2009 |
| JP | 2012-096332 | 5/2012 |
| JP | 2012-196766 | 10/2012 |
| WO | WO 03/037577 | 5/2003 |

OTHER PUBLICATIONS

Japanese Office Action for corresponding JP Application No. 2013-156047, May 12, 2015.
Extended European Search Report for corresponding EP Application No. 14178132.8-1712, Apr. 1, 2016.
Extended European Search Report for corresponding EP Application No. 14178133.6-1712, Apr. 1, 2016.
Office Action issued by the U.S. Patent and Trademark Office for the co-pending U.S. Appl. No. 14/340,488, Mar. 16, 2016.
Japanese Office Action for corresponding JP Application No. 2013-194709, Feb. 2, 2016.
Japanese Office Action for corresponding JP Application No. 2013-156047, Oct. 27, 2015.
Office Action with Form PTO-892 Notice of Reference Cited issued by the U.S. Patent and Trademark Office for the co-pending U.S. Appl. No. 14/340,488, Dec. 3, 2015.
Chinese Office Action for corresponding CN Application No. 201410332521.7, Sep. 25, 2015.
Japanese Office Action for corresponding JP Application No. 2013-194709, Aug. 30, 2016.
Chinese Office Action for corresponding CN Application No. 201410332521.7, Jun. 2, 2016.
Chinese Office Action for corresponding CN Application No. 201410332521.7, Dec. 1, 2016.
European Office Action for corresponding EP Application No. 14 178 133.6-1712, Mar. 28, 2017.
European Office Action for corresponding EP Application No. 14 178 132.8-1712, Mar. 23, 2017.

* cited by examiner

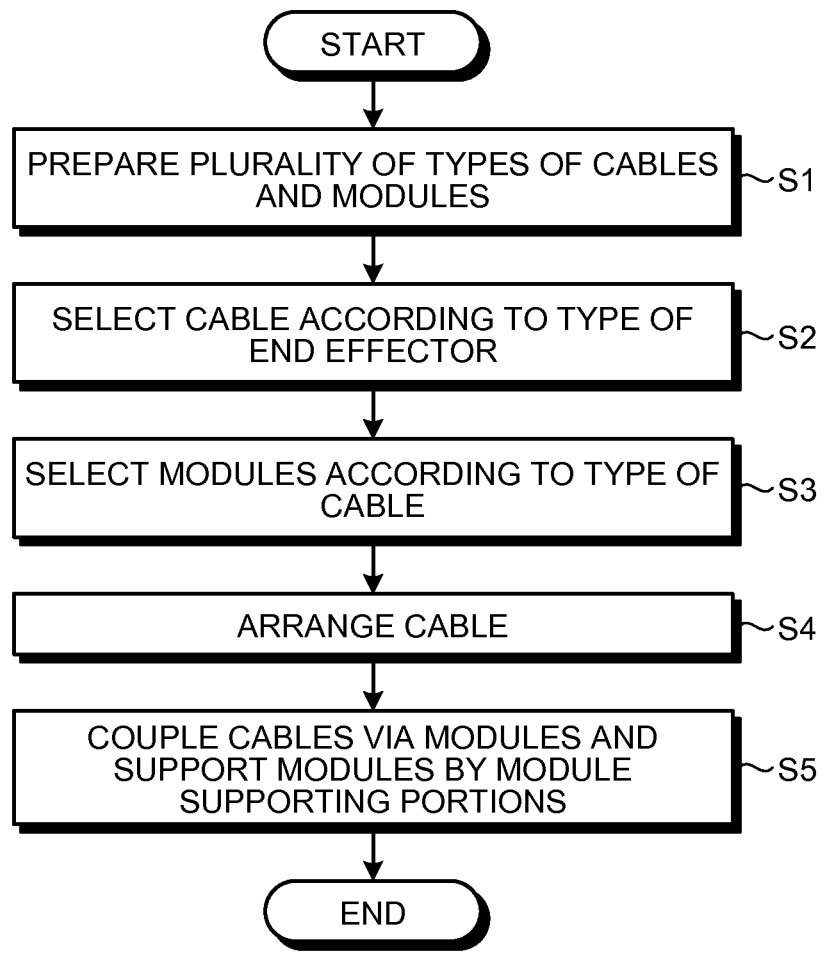

ROBOT AND MANUFACTURING METHOD OF THE SAME

CROSS-REFERENCE TO RELATED APPLICATION

This application is based upon and claims the benefit of priority from the prior Japanese Patent Application No. 2013-156047, filed on Jul. 26, 2013, the entire contents of which are incorporated by reference.

FIELD

The embodiment discussed herein is directed to a robot and a manufacturing method of the same.

BACKGROUND

Japanese Patent No. 5151513 discloses a robot that includes a robot body such as arms and a wrist portion, and an end effector (e.g., a spot welding gun) connected to the robot body, and performs a given work with the end effector.

SUMMARY

An robot according to an aspect of an embodiment includes a robot body, an end effector, a cable, and one or more coupling portions. The end effector is connected to the robot body. The cable is composed of a plurality of sub cables, arranged along the robot body, and connected to the end effector. Each of the coupling portion is provided between one sub cable and an adjacent sub cable of the sub cables to couple the one and adjacent sub cables together.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flowchart illustrating a manufacturing procedure of the robot illustrated in FIG. 1;

DESCRIPTION OF EMBODIMENT

A robot according to an embodiment includes a robot body, an end effector, a cable, and one or more coupling portions. The end effector is connected to the robot body. The cable is composed of a plurality of sub cables, arranged along the robot body, and connected to the end effector. Each of the coupling portion is provided between one sub cable and an adjacent sub cable of the sub cables, and couples the one and adjacent sub cables together.

Furthermore, a method of manufacturing the robot in the embodiment includes preparing a robot body and an end effector, preparing a cable composed of a plurality of sub cables, arranging the sub cables along the robot body, providing a coupling portion that couples the sub cables on the robot body, connecting the sub cables via the coupling portion, and connecting the end effector to the cable.

Figure 1:
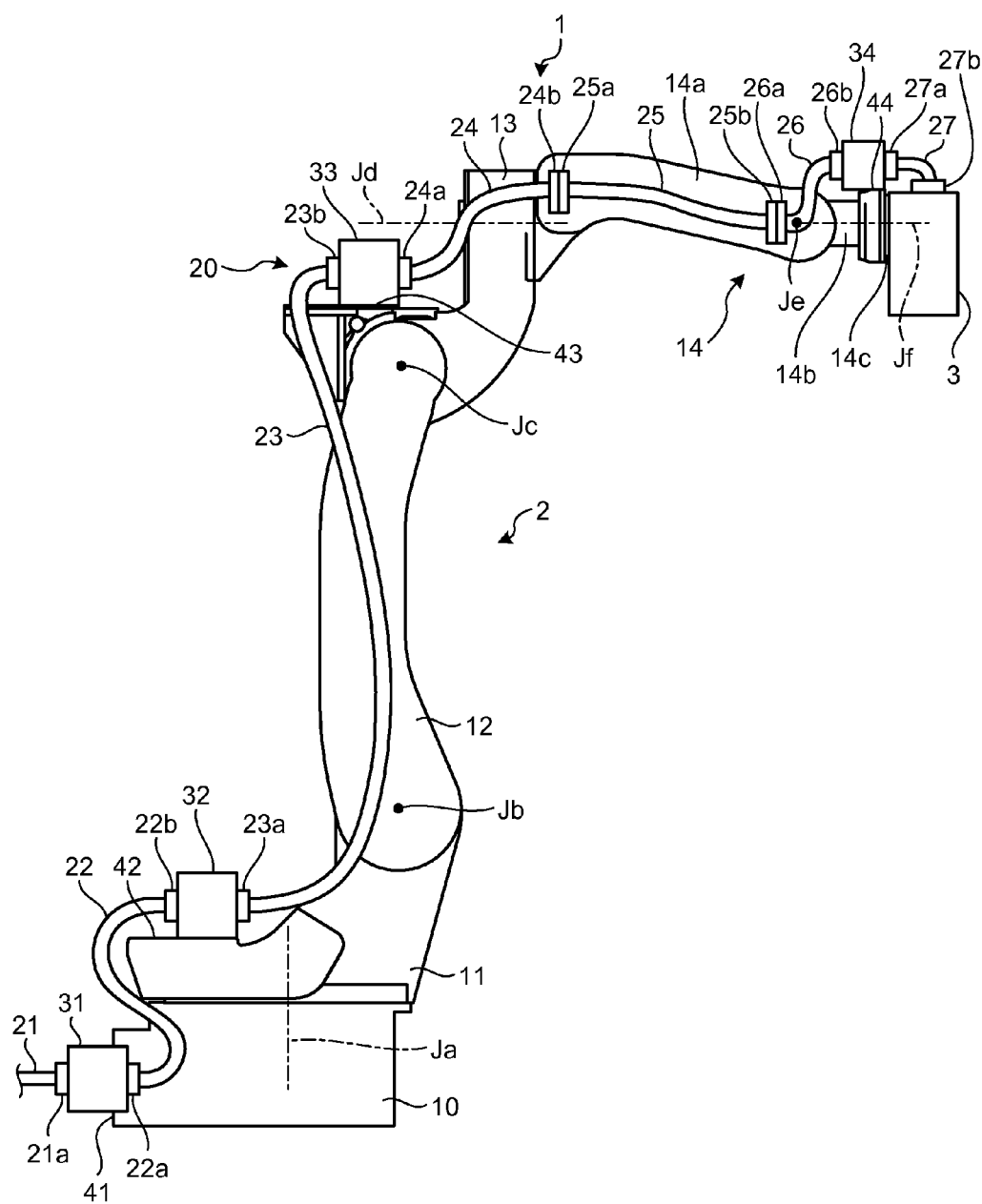
FIG. 1 is a general view schematically illustrating a robot according to an embodiment.

The following describes the robot and the method of manufacturing the robot in the embodiment. FIG. 1 is a general view schematically illustrating a robot 1 according to the embodiment. The robot 1, as illustrated in FIG. 1, is an articulated robot that has a plurality of links and a plurality of rotation axes (articulated axes) Ja to Jf connecting the respective links.

In detail, the robot 1 includes a robot body 2, and an end effector 3 connected to the robot body 2. The robot body 2 of the robot 1 includes, as the links, a base 10, a revolving portion 11, a lower arm 12, an upper arm 13, and a wrist portion 14 that includes first to third wrist portions 14a to 14c, and the foregoing are rotatably connected to one another.

Specifically, the revolving portion 11 is connected to be rotatable about the rotor shaft Ja with respect to the base 10, and the lower arm 12 is connected to be rotatable about the rotor shaft Jb, which is perpendicular to the rotor shaft Ja, with respect to the revolving portion 11. The upper arm 13 is connected to be rotatable about the rotor shaft Jc, which is in parallel with the rotor shaft Jb, with respect to the lower arm 12, and the first wrist portion 14a is connected to be rotatable about the rotor shaft Jd, which is perpendicular to the rotor shaft Jc, with respect to the upper arm 13.

The second wrist portion 14b is connected to be rotatable about the rotor shaft Je, which is perpendicular to the rotor shaft Jd, with respect to the first wrist portion 14a, and the third wrist portion 14c is connected to be rotatable about the rotor shaft Jf, which is perpendicular to the rotor shaft Je, with respect to the second wrist portion 14b.

The above-described terms such as "perpendicular" and "parallel" do not necessarily need to be precisely accurate in a mathematical sense, and thus practical tolerance and errors are permitted. Furthermore, the term "perpendicular" in the specification does not only mean that two lines (rotor shafts, for example) intersect at right angles on the same plane, but also means a situation in which the two lines are in the relation of being skewed.

The robot 1 further includes actuators Ma to Mf (not illustrate) that rotationally drive the revolving portion 11, the lower arm 12, the upper arm 13, the first to the third wrist portions 14a to 14c in the foregoing. The respective actuators Ma to Mf are specifically servo motors, for example.

While the actuators Ma to Mf are defined as servo motors in the foregoing, they are not limited to those and may be other types of motors, for example, hydraulic motors. In the following description, the actuator is described as "motor".

The following describes the respective motors Ma to Mf. The motor Ma is connected to the revolving portion 11 and rotationally drives the revolving portion 11. The motor Mb is connected to the lower arm 12 and rotationally drives the lower arm 12, while the motor Mc is connected to the upper arm 13 and rotationally drives the upper arm 13.

The motor Md is connected to the first wrist portion 14a and rotationally drives the first wrist portion 14a, while the motor Me is connected to the second wrist portion 14b and rotationally drives the second wrist portion 14b. Likewise, the motor Mf is connected to the third wrist portion 14c and rotationally drives the third wrist portion 14c. The foregoing motors Ma to Mf receive signals representing operating instructions from a control device not depicted, and based on the signals, the operation thereof is controlled.

The end effector 3 is connected to the wrist portion 14 of the robot body 2, specifically, on the end side of the third wrist portion 14c, for example. The end effector 3 is a spot welding gun, for example. In FIG. 1, to simplify the illustration, the end effector 3 and later described modules are schematically represented by blocks.

The robot 1 thus configured performs a given work, for example, welding on a work piece not depicted, while appropriately changing the position and the angle of the end effector 3 by the operation of the motors Ma to Mf being controlled by the control device.

While a spot welding gun is exemplified to be provided as the end effector 3 in the foregoing, this is illustrative only and not intended to be limited, and the end effector 3 may be a welding torch, for example. Furthermore, while a welding work is cited as an example of a given work that the robot 1 performs, it is not limited to this. In other words, when the robot 1 performs other work such as conveying work pieces, a hand that grasps a work piece or an attracting portion that attracts and holds a work piece may be provided as the end effector 3, for example.

As in the foregoing, the robot 1 is configured such that one end effector 3 out of a plurality of types can be selectively attached depending on the specification, specifically, depending on the details of work and use. The robot 1 here is assumed to include a spot welding gun as the end effector 3 as described above.

Connected to such an end effector 3 is a cable 20 according to the type of the end effector 3. The cable 20, as illustrated in FIG. 1, is arranged along the robot body 2. In detail, the cable 20 is arranged to extend from the base 10, which is the base end side of the robot body 2, via the revolving portion 11, the lower arm 12, the upper arm 13, and the wrist portion 14, to the end effector 3.

While the cable 20 is exemplified to be arranged to be exposed on the outside of the robot body 2 in FIG. 1, it is not limited to this. In other words, a part or the whole of the cable 20 may be structured to run through inside the robot body 2 so as not to be exposed.

Supposing that the cable is a single cable continuing from the base of the robot body to the end effector, the maintainability of the cable may be lowered. In other words, when the continuous cable is used as in the foregoing, even in a situation in which the cable is partially damaged, for example, the whole cable is to be replaced, and thus the maintainability of the cable may be lowered.

Hence, the robot 1 in the present embodiment is so structured that the maintainability of the cable 20, which is connected to the end effector 3, can be improved.

Furthermore, as in the foregoing, the cable 20 is selected and used according to the type of the end effector 3. Moreover, various devices, for example, valves and meter gauges are inserted in the midway of the cable 20, and the various devices are installed on the robot body 2. The type of the cable 20 and the installation locations of the devices differ depending on the specification of the robot 1.

Consequently, in conventional technologies, when the specification of the robot is determined, the cable and the devices are made after the determination according to the specification and then the cable and others made are arranged (outfitted) on the robot. However, when they are made as in the conventional technologies, it may take a relatively long time from the determination of the specification to the completion of the robot.

Hence, the robot 1 in the present embodiment is so structured that the time taken from the determination of the specification to the completion of the robot 1 can be reduced as much as possible, and the manufacturability of the robot 1 itself can be improved. The following describes in detail the structure of the robot 1.

As illustrated in FIG. 1, the robot 1 includes the above-described cable 20, modules 31 to 34, and module supporting portions 41 to 44.

It is assumed that there are a plurality of types of the cables 20, and the cables the number of which corresponds to the number of types of the end effectors 3 attachable to the robot body 2 are prepared (see FIG. 4 described later). When the specification of the robot 1, for example, the type of the end effector 3 to be attached is determined, the cable 20 corresponding to the determined type of the end effector 3 is selected out of the cables 20 of different types and is arranged on the robot body 2.

As for the cable 20 for example, it is assumed that a conduit cable, which includes therein a power cable, an air hose, and a cooling water hose according to the type of the end effector 3, is selected and arranged. The power cable is a cable to supply the power to the end effector 3, the air hose is a hose to supply air to drive the end effector 3, and the cooling water hose is a hose to supply cooling water used in the end effector 3.

In the present specification, the above-described power cable, air hose, and others may be collectively described as "cables and hoses". While the cable 20 is exemplified to include three types of cables and hoses in the foregoing, this is illustrative only and not intended to be limited, and the cable 20 may include two or less types or may include four or more types, for example. The types of cables and hoses are not limited to the foregoing, and may be other cables and hoses, for example, a signal cable for the end effector 3.

The cable 20 is formed in an elongate shape and is divided into a plurality of cables so as to line along the directions of axes. Specifically, the cable 20 is divided at the locations at which the later-described modules 31 to 34 are disposed and at the portions at which the frequency of driving is relatively high in the robot body 2.

More specifically, the cable 20 is divided into a first sub cable 21 and a second sub cable 22 near the base 10, and is divided into the second sub cable 22 and a third sub cable 23 near the revolving portion 11. The cable 20 is further divided into the third sub cable 23 and a fourth sub cable 24 near the upper arm 13.

Moreover, the cable 20 is further divided in the direction of axis near the wrist portion 14. In detail, the cable 20 is divided into the fourth sub cable 24 and a fifth sub cable 25 near the connecting portion of the upper arm 13 and the first wrist portion 14a. The cable 20 is further divided into the fifth sub cable 25 and a sixth sub cable 26 near the connecting portion of the first wrist portion 14a and the second wrist portion 14b.

Furthermore, the cable 20 is divided into the sixth sub cable 26 and a seventh sub cable 27 near the wrist portion 14, for example, near the second wrist portion 14b.

As in the foregoing, the cable 20 is composed of a plurality of sub cables 21 to 27.

While the cable 20 is exemplified to be divided into seven sub cables of the first to the seventh sub cables 21 to 27 in the foregoing, they are not limited to this and may be divided into two to six sub cables or into eight or more sub cables.

In the first sub cable 21, a power supplying device, an air supplying device, and a cooling water supplying device not depicted are connected on one end, while a connector 21a is attached on the other end. In the second sub cable 22, a connector 22a is attached on one end, while a connector 22b is also attached on the other end.

Likewise, in the third to the seventh sub cables 23 to 27, connectors 23a to 27a are attached on one ends, while connectors 23b to 27b are attached on the other ends, respectively. Then, the connector 27b of the seventh sub cable 27 on the other end side is connected to the end effector 3.

There are a plurality (e.g., four pieces) of modules 31 to 34, and the modules are provided (inserted) between the divided cables 20 to couple the cables 20 in series.

The module here is a segment unit of the cable 20 that includes a mechanism (connector) to couple the divided cables 20, and because the specifications of the mechanisms for the connectors, cables, and the like actually used are different, there are a plurality of types of modules.

Specifically, the module 31 is disposed on the base 10, and is connected to the connector 21a of the first sub cable 21 and to the connector 22a of the second sub cable 22 to couple the first sub cable 21 and the second sub cable 22 together, for example.

Furthermore, the module 32 is disposed on the revolving portion 11, and is connected to the connector 22b of the second sub cable 22 and to the connector 23a of the third sub cable 23 to couple the second sub cable 22 and the third sub cable 23 together.

The module 33 is disposed on the upper arm 13, and is connected to the connector 23b of the third sub cable 23 and to the connector 24a of the fourth sub cable 24 to couple the third sub cable 23 and the fourth sub cable 24 together.

Moreover, the module 34 is disposed on the wrist portion 14 (e.g., the second wrist portion 14b), and is connected to the connector 26b of the sixth sub cable 26 and to the connector 27a of the seventh sub cable 27 to couple the sixth sub cable 26 and the seventh sub cable 27 together.

As in the foregoing, the cable 20 is divided into a plurality of cables and the divided cables 20 are coupled via the modules 31 to 34, and thus the maintainability of the cable 20 can be improved.

In other words, in the robot 1, supposing that any one of the divided cables 20 is damaged, only the damaged cable can be replaced, and thus the maintainability of the cable 20 can be improved.

The structure of the respective modules 31 to 34 will be described later in detail. In the following description, the module 31 disposed on the base 10 is referred to as "first module 31", and the module 32 disposed on the revolving portion 11 is referred to as "second module 32". Furthermore, the module 33 disposed on the upper arm 13 is referred to as "third module 33", and the module 34 disposed on the wrist portion 14 is referred to as "fourth module 34".

Directly connecting the connector 24b and the connector 25a together couples the fourth sub cable 24 and the fifth sub cable 25 in series. Likewise, directly connecting the connector 25b and the connector 26a together couples the fifth sub cable 25 and the sixth sub cable 26 in series.

That is, the above-described modules 31 to 34 and the connectors 21a to 27a and 22b to 27b serve as coupling portions that couple the respective sub cables 21 to 27.

As in the foregoing, the cable 20 is divided into the fourth to the sixth sub cables 24 to 26 at the portions at which the frequency of driving is relatively high in the robot body 2, specifically, the wrist portion 14. The fourth to the sixth sub cables 24 to 26 are coupled via the connectors 24b and 25a and the connectors 25b and 26a. This can further improve the maintainability of the cable 20.

In other words, the frequencies of driving the first wrist portion 14a and the second wrist portion 14b of the wrist portion 14 are likely to be higher than that of the base 10, the lower arm 12, and others, and thus the cable 20 disposed near the wrist portion 14 is more likely to be damaged for that extent.

Hence, in the robot 1 in the present embodiment, being structured as in the foregoing enables, supposing that the cable near the wrist portion 14 is damaged, only the damaged cable to be replaced easily. In addition, the lengths of the replacing cables can be shortened, and as a result, the maintainability of the cable 20 can be further improved.

Provided at a plurality of places (e.g., four places) on the robot body 2 are module supporting portions 41 to 44, and they support the first to the fourth modules 31 to 34, respectively. These module supporting portions 41 to 44 are examples of a supporting portion.

In the following description, the module supporting portion 41 corresponding to the first module 31 is referred to as "first module-supporting portion 41", and the module supporting portion 42 corresponding to the second module 32 is referred to as "second module-supporting portion 42". Likewise, the module supporting portion 43 corresponding to the third module 33 is referred to as "third module-supporting portion 43", and the module supporting portion 44 corresponding to the fourth module 34 is referred to as "fourth module-supporting portion 44".

As illustrated in FIG. 1, the first module-supporting portion 41 is provided on the base 10, and supports the first module 31. The second module-supporting portion 42 is provided on the revolving portion 11, and supports the second module 32. Furthermore, the third module-supporting portion 43 is provided on the upper arm 13, and supports the third module 33. The fourth module-supporting portion 44 is provided on the wrist portion 14, for example, the second wrist portion 14b, and supports the fourth module 34.

The first to the fourth module-supporting portions 41 to 44 only need to be in a shape by which the first to the fourth modules 31 to 34 can be supported, and may be in any shape such as a planar shape and a recessed shape. While it is exemplified that the first module-supporting portion 41 is provided on the side surface of the base 10 and the second to the fourth module-supporting portions 42 to 44 are provided on the upper surfaces of the revolving portion 11, the upper arm 13, and the second wrist portion 14b, respectively, in FIG. 1, they are illustrative only and not intended to be limited.

In other words, the first to the fourth module-supporting portions 41 to 44 only need to be at the positions at which the respective modules 31 to 34 can be supported. For example, the first module-supporting portion 41 may be provided on the upper surface of the base 10, and the second and the third module-supporting portions 42 and 43 may be provided on the side surfaces of the revolving portion 11 and the upper arm 13, respectively, to support the first to the third modules 31 to 33 at the respective locations. Furthermore, the fourth module-supporting portion 44 may be provided on the wrist portion 14 other than the second wrist portion 14b, for example, the first wrist portion 14a or the third wrist portion 14c, to support the fourth module 34 at that location.

Figure 2A:
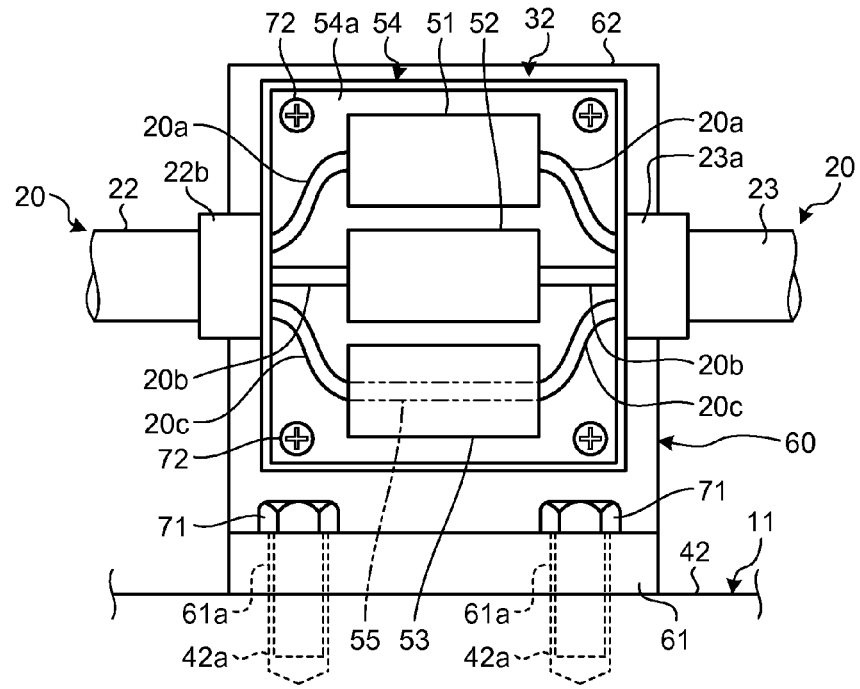
FIG. 2A is a schematic front view of a second module illustrated in FIG. 1.
Figure 2B:
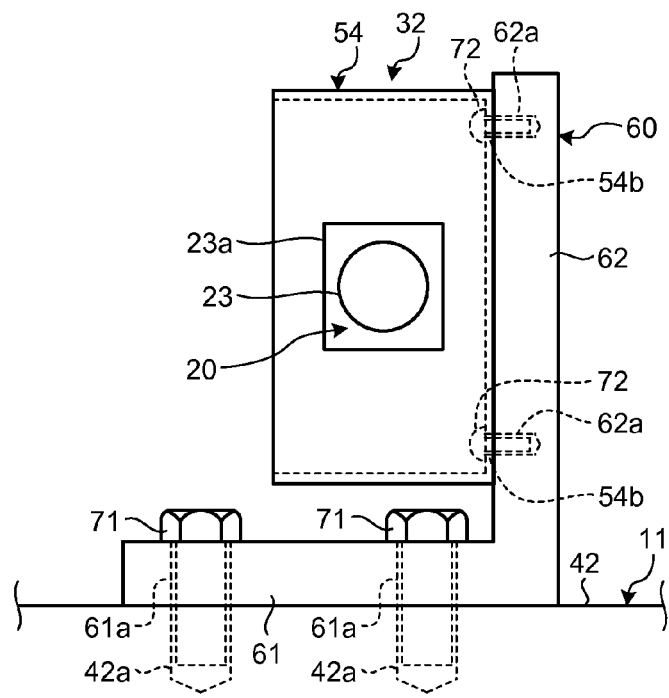
FIG. 2B is a schematic right-side view of the second module illustrated in FIG. 2A.

Next, with reference to FIGS. 2A and 2B, described in detail are the structures of the first to the fourth modules 31 to 34, and the method of supporting the first to the fourth modules 31 to 34 by the first to the fourth module-supporting portions 41 to 44. In the following description, explained is an example with the second module 32 and the second module-supporting portion 42.

FIG. 2A is a front view schematically illustrating the second module 32, and FIG. 2B is a schematic right-side view of the second module 32 illustrated in FIG. 2A. In the following description, the second module 32 may be described as "module 32" and the second module-supporting portion 42 may be described as "module supporting portion 42".

It is assumed that there are a plurality of types of the modules 32, and the modules the number of which corresponds to the number of types of the cables 20 that can be coupled are prepared (see FIG. 4 described later). When the specification of the robot 1, for example, the type of the coupling cable 20 is determined, the module 32 corresponding to the determined type of the cable 20 is selected out of the modules 32 of different types and is attached on the module supporting portion 42.

The explanation is continued assuming that the cable 20 here, as illustrated in FIG. 2A, has a power cable 20a, an air hose 20b, and a cooling water hose 20c.

It is further assumed that the module 32 provided with a plurality (e.g., three pieces) of devices 51 to 53 and a housing portion 54 is selected according to the specification of the robot 1. In the following description, the device 51 is referred to as "first device 51", the device 52 is referred to as "second device 52", and the device 53 is referred to as "third device 53". In FIG. 2A, to simplify the illustration, the first to the third devices 51 to 53 are schematically represented as blocks.

The first device 51 is a device to which the power cable 20a is connected, and is a relay box for power supply, for example. The second device 52 is a device to which the air hose 20b is connected, and is a device for air, for example, a valve. The third device 53 is a device to which the cooling water hose 20c is connected, and is a device for cooling water, for example, a flow meter.

The housing portion 54 is in a rectangular parallelepiped shape, and is formed to have a space 54a inside, for example. In the space 54a of the housing portion 54, the first to the third devices 51 to 53 in the foregoing are fixed in a housed state.

While the above-described third device 53 is specifically defined as a flow meter, it is illustrative only, and depending on the specification of the robot 1, it may be a valve for cooling water. Furthermore, as indicated by imaginary lines in FIG. 2A, when the device for cooling water is not necessary in the portion of the module 32 according to the specification of the robot 1, it may be a coupling hose 55 that directly couples the cooling water hoses 20c. Likewise, the specific devices cited above for the first and the second devices 51 and 52 are illustrative only, and are to be changed according to the specification of the robot 1.

As in the foregoing, to manufacture the robot 1, a plurality of types of the cables 20 as well as a plurality of types of the modules 32 are prepared first. The cable 20 corresponding to the type of the end effector 3 is selected out of the cables 20 of different types and is arranged, and the module 32 corresponding to the type of the cable 20 is selected out of the modules 32 of different types and is attached. Consequently, the time taken from the determination of the specification of the robot 1 to the completion of the robot 1 can be reduced as much as possible, and the manufacturability of the robot 1 itself can be improved.

In other words, by preparing pluralities of types of the cables 20 and the modules 32 in advance before the specification is determined, the time taken to complete the robot 1 can be reduced compared to a situation in which the cables and devices are made after the specification is determined and the cables and others made are then arranged on the robot 1, for example. Thus, reducing the manufacturing time of the robot 1 can improve the manufacturability of the robot 1 itself.

While the second module 32 is explained as an example in the foregoing, the same applies to the first, the third, and the fourth modules 31, 33, and 34. In other words, a plurality of types of the first, the third, and the fourth modules 31, 33, and 34 are prepared, and the respective modules according to the specification of the robot 1, for example, the type of the cable 20, are selected and attached. This can yield the same effects such as the reduction in the manufacturing time of the robot 1 and the improvement in the manufacturability of the robot 1 itself.

Furthermore, because the first module 31 is inserted on the base end side of the cable 20, the devices to be mounted on the first module 31 are preferable to be a filter for air and a connecting adaptor for a cooling water hose, for example. However, they are not limited to these.

The second and the third modules 32 and 33 are positioned at heights in the robot body 2 that are easy for an operator to perform operation or to see. For this reason, the devices to be mounted on the second and the third modules 32 and 33 are preferable to be a valve and a meter gauge that are operated or visibly checked by a worker, for example. However, they are not limited to these.

Moreover, because the second and the third modules 32 and 33 have larger surrounding spaces, the devices to be mounted thereon are preferable to be a relatively large device, for example, an information lamp that turns on when the power is applied to the power cable. However, they are not limited to this.

The fourth module 34 is inserted immediately before the end effector 3 in the cable 20. For this reason, the device to be mounted on the fourth module 34 is preferable to be, for example, a converter that converts the cables and hoses of the cable 20 into the connectors or the like in shapes suitable for connection to the end effector 3. However, it is not limited to this.

Continuing the explanation of the module 32, the module 32 thus structured is, as illustrated in FIGS. 2A and 2B, connected to and supported by the module supporting portion 42 via an attaching member 60.

The attaching member 60 includes a base portion 61 and a sidewall portion 62. The base portion 61 contacts the module supporting portion 42, and is formed in a flat plate shape. The sidewall portion 62 is formed to extend from the end portion of the base portion 61 in the direction perpendicular to the base portion 61. Consequently, the attaching member 60 is formed in a substantially L-shape in a side view, for example. The shape of the attaching member 60 is not limited to the foregoing, and may be in another shape such as a substantially U-shape and an inverted T-shape in a side view.

Appropriate positions of the base portion 61 have insertion holes 61a through which respective bolts 71 can be inserted. In the module supporting portion 42, further formed at the positions corresponding to the insertion holes 61a are female screw portions 42a into which the bolts 71 can be fitted.

As illustrated in FIG. 2B, appropriate positions of the housing portion 54 of the module 32 have insertion holes 54b through which respective bolts 72 can be inserted. In the sidewall portion 62, further formed at the positions corresponding to the insertion holes 54b are female screw portions 62a into which the bolts 72 can be fitted.

Consequently, inserting and tightening the bolts 71 through the insertion holes 61a and the female screw portions 42a fix the attaching member 60 onto the module supporting portion 42. Furthermore, inserting and tightening the bolts 72 through the insertion holes 54b and the female screw portions 62a fix the module 32 to the attaching member 60.

As in the foregoing, the module 32 is connected to and supported by the module supporting portion 42 via the attaching member 60. The respective numbers and positions of the bolts 71 and 72, the insertion holes 61a and 54b, and the female screw portions 42a and 62a are not limited to those illustrated in the drawings.

The devices to be mounted on the module 32 vary depending on the type of the cable 20, and thus the size of the housing portion 54 in the module 32 may also vary depending on the type of the cable 20.

In the robot 1, however, even when the size and others of the housing portion 54 are varied, without changing the positions of the female screw portions 62a of the attaching member 60, the positions of the insertion holes 54b of the housing portion 54 are changed so as to align with the female screw portions 62a. This enables the module 32 after the change to be attached to the attaching member 60 even when the type of the module 32 is changed.

As in the foregoing, by providing a structure in which the various modules 32 can be attached to the attaching member 60 without changing the positions of the female screw portions 62a thereof, the attaching member 60 can be standardized, and thus the number of components to be prepared before manufacturing the robot 1 can be reduced.

While the module 32 is exemplified to include the housing portion 54 in the foregoing, such a structure is illustrative only, and by removing the housing portion 54, the first to the third devices 51 to 53 may be fixed directly onto the attaching member 60. Furthermore, by removing the attaching member 60, the first to the third devices 51 to 53 may be fixed directly onto the module supporting portion 42.

Moreover, the module 32 is not necessary to be fixed onto the module supporting portion 42, and the module 32 may be placed on and supported by the module supporting portion 42, for example. The foregoing description in which the housing portion 54 and the attaching member 60 may be removed and the module 32 may be placed on the module supporting portion 42 also applies to the first, the third, and the fourth modules 31, 33, and 34.

Next, the specific process of manufacturing the above-described robot 1 by outfitting the cable 20 and the first to the fourth modules 31 to 34 will be described with reference to FIGS. 3 and 4. FIG. 3 is a flowchart illustrating the manufacturing procedure of the robot 1. FIG. 4 is a diagram for explaining the outfitting of the robot 1. It is assumed that the robot body 2 and the end effector 3 have been prepared in advance.

Figure 4:
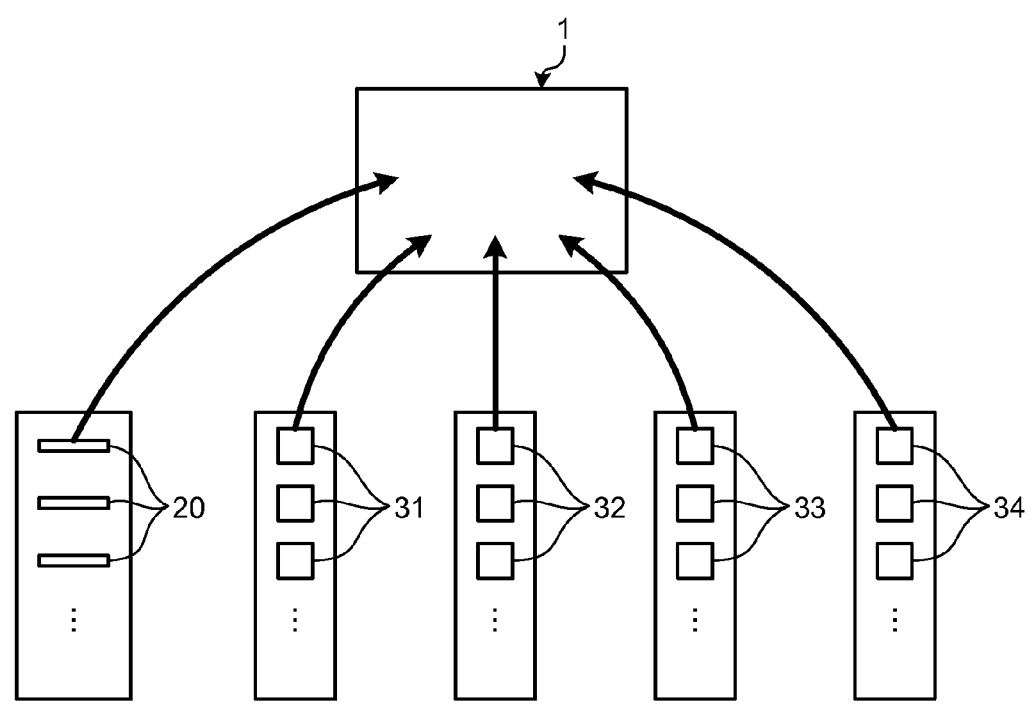
FIG. 4 is a diagram for explaining the outfitting of the robot illustrated in FIG. 1.

As illustrated in FIG. 4, before the specification of the robot 1 is determined, a plurality of types of the cables 20, that is, the cables 20 composed of a plurality of sub cables 21 to 27 are first prepared (arranged) in advance based on the types of the end effectors 3 that may be mounted on the robot 1. Furthermore, based on the types of the prepared cables 20, a plurality of types of the first to the fourth modules 31 to 34 each are also prepared (Step S1).

In FIG. 4, although a plurality of types of the cables 20 and those of the first to the fourth modules 31 to 34 are illustrated in the same shapes to simplify the illustration, the cables and hoses included therein or the devices mounted thereon are different from one another. Furthermore, in FIG. 4, although the cable 20 is illustrated as a single cable to simplify the illustration, the cable 20 is assumed to be divided into the first to the seventh sub cables 21 to 27 as in the foregoing.

Next, when the specification of the robot 1 is determined, the cable 20 is selected from the cables 20 of different types in accordance with the type of the end effector 3 (Step S2). In FIG. 4, it is assumed that the topmost cable 20 in the drawing was selected.

Then, out of the first to the fourth modules 31 to 34 each having different types, the first to the fourth modules 31 to 34 are selected according to the type of the cable 20 to couple (Step S3). In FIG. 4, it is assumed that the topmost ones of the first to the fourth modules 31 to 34 in the drawing were selected.

Next, as illustrated by arrows in FIG. 4, the cable 20 selected at Step S2 is arranged on the robot 1 (Step S4). Specifically, the sub cables 21 to 27 are arranged along the robot body 2. Subsequently, the first to the fourth modules 31 to 34 selected at Step S3 are provided on the robot body 2 while being inserted between the divided cables 20, and then the cables 20 (the sub cables 21 to 27) are coupled together (Step S5). Furthermore, at Step S5, the first to the fourth modules 31 to 34 are supported by the respective first to the fourth module-supporting portions 41 to 44 (Step S5).

At Step S5, the connection of the fourth sub cable 24 and the fifth sub cable 25, and the connection of the fifth sub cable 25 and the sixth sub cable 26 are also made. Subsequently, connecting the end effector 3 to the cable 20 completes the robot 1.

As in the foregoing, in the present embodiment, the robot 1 includes the robot body 2 and the end effector 3. The end effector 3 is connected to the robot body 2. The cable 20 that is connected to the end effector 3 and divided into a plurality of cables in the directions of axes is arranged along the robot body 2. The first to the fourth module-supporting portions 41 to 44 supporting the first to the fourth modules 31 to 34, which are inserted between the divided cables 20 and couple the cables 20 together, are further provided on the robot body 2.

This can improve the maintainability of the cable 20 that is connected to the end effector 3.

Furthermore, disposing the first module 31 on the base 10, the second module 32 on the revolving portion 11, the third module 33 on the upper arm 13, and the fourth module 34 on the wrist portion 14 enables the robot 1 to employ various specifications.

In other words, structuring the robot 1 in the foregoing manner allows the types and positions of the devices mounted on the first to the fourth modules 31 to 34 to be prepared in many patterns, and thus, even when the specification varies extensively, the robot 1 can be appropriately customized and manufactured.

Figure 5:
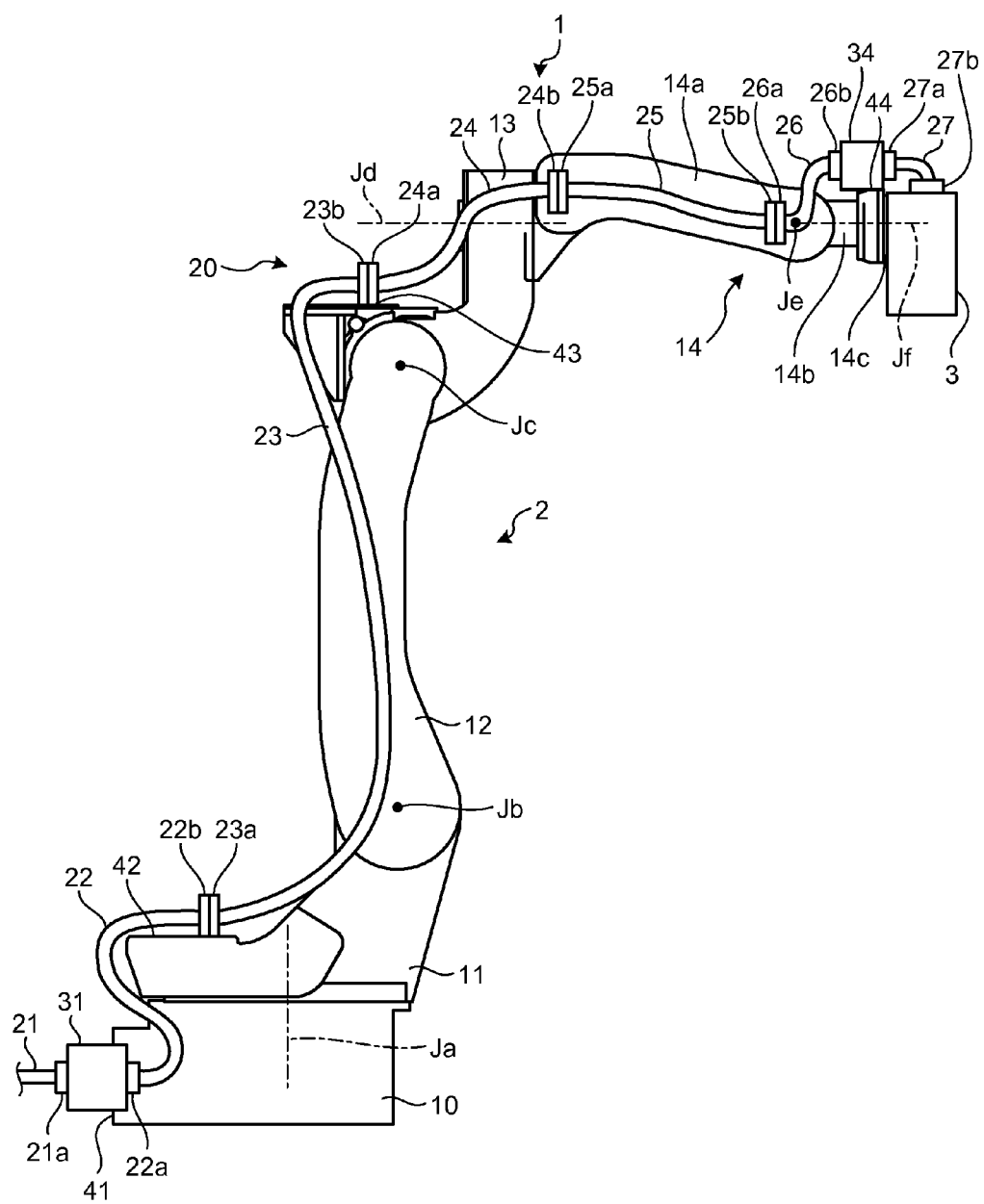
FIG. 5 is a schematic general view of a robot illustrating a modification of the robot in the embodiment.

FIG. 5 is a schematic general view of the robot 1 illustrating a modification of the robot 1 in the embodiment. In the example illustrated in FIG. 5, the second module 32 and the third module 33 are removed.

Directly connecting the connector 22b of the second sub cable 22 and the connector 23a of the third sub cable 23 couples the second sub cable 22 and the third sub cable 23 together. Furthermore, directly connecting the connector 23b of the third sub cable 23 and the connector 24a of the fourth sub cable 24 couples the third sub cable 23 and the fourth sub cable 24 together.

As in the foregoing, depending on the specification of the robot 1, the robot 1 may be structured not to include the second module 32 and the third module 33. While the second module 32 and the third module 33 are not included in the foregoing, it is not limited to this and any one of or two or more of the first to the fourth modules 31 to 34 may be removed, for example.

While the robot 1 has been exemplified with a six-axis robot in the foregoing embodiment, it is not limited to such a configuration, and a robot other than a six-axis robot, for example, a seven-axis robot and an eight-axis robot can be used.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

The following discloses further aspects concerning the above-described embodiment.

(1) A robot including a robot body and an end effector connected to the robot body, in which a cable that is connected to the end effector and divided into a plurality of cables is arranged along the robot body, and a module supporting portion that supports a module which is provided between the divided cables and couples the cables together is provided on the robot body.

(2) The robot described in the above-described paragraph (1) in which a plurality of types of modules are available, and the module is selected from the modules of different types in accordance with at least the type of the cable to couple.

(3) The robot described in the above-described paragraph (1) or (2) in which a plurality of types of cables are available, and the cable is selected from the cables of different types in accordance with at least the type of the end effector.

(4) The robot described in any one of the above-described paragraphs (1) to (3) in which the robot body includes a base, the cable is divided near the base, and the module is disposed on the base.

(5) The robot described in any one of the above-described paragraphs (1) to (4) in which the robot body includes a base and a revolving portion rotatably connected to the base, the cable is divided near the revolving portion, and the module is disposed on the revolving portion.

(6) The robot described in any one of the above-described paragraphs (1) to (5) in which the robot body includes a lower arm and an upper arm rotatably connected to the lower arm, the cable is divided near the upper arm, and the module is disposed on the upper arm.

(7) The robot described in any one of the above-described paragraphs (1) to (6) in which the robot body includes a wrist portion to which an end effector is connected, the cable is divided near the wrist portion, and the module is disposed on the wrist portion.

(8) The robot described in any one of the above-described paragraphs (1) to (7) in which the robot body includes a wrist portion to which an end effector is connected, the cable is further divided near the wrist portion, and the cables divided near the wrist portion are coupled in series via a connector.

(9) A method of manufacturing a robot including cable-arranging to arrange a cable that is connected to an end effector and divided into a plurality of cables along a robot body, and module-supporting by a module supporting portion provided on the robot body to support a module that is provided between the divided cables and couples the cables together.

(10) The method of manufacturing a robot described in the above-described paragraph (9) further including module-selecting to select the module out of a plurality of types of modules available at least in accordance with the type of the cable to couple.

(11) The method of manufacturing a robot described in the above-described paragraph (9) or (10) further including cable-selecting to select the cable out of a plurality of types of cables available according to at least the type of the end effector.

What is claimed is:

1. A robot comprising:
   a robot body including a base, a revolving portion, a lower arm, an upper arm, a first wrist portion, a second wrist portion, and a third wrist portion which are connected in this order;
   an end effector connected to the third wrist portion;
   a cable composed of a plurality of sub cables, the cable being arranged along the robot body and connected to the end effector; and
   a plurality of coupling portions each of which is provided between one sub cable and an adjacent sub cable among the plurality of sub cables to couple the one and adjacent sub cables together, the plurality of coupling portions comprising:
      a first module provided on the upper arm, a first sub cable and a second sub cable provided between the base and the upper arm being coupled in the first module;
      a second module provided on the second wrist portion, a third sub cable and a fourth sub cable connected at the second wrist portion being coupled in the second module;
      a first connector and a second connector directly connected to the first connector in which two sub cables provided between the first module and the second module are coupled without using a module;
      a third connector connected to the first sub cable;
      a fourth connector connected to the second sub cable;
      a fifth connector via which the third sub cable is connected to the second module; and
      a sixth connector via which the fourth sub cable is connected to the second module,
   wherein at least one of the first module and the second module is selected from a plurality of types of modules in accordance with a type of the cable to be coupled with the at least one of the first module and the second module,
   wherein the at least one of the first module and the second module includes a device corresponding to the type of the cable to be coupled with the at least one of the first module and the second module, and
   wherein the third connector and the fourth connector are configured to:
      connect via the first module in a first connection arrangement; and
      directly connect to each other without the first module in a second connection arrangement.

2. The robot according to claim 1, further comprising one or more supporting portions each of which is provided on the robot body to support the corresponding coupling portion.

3. The robot according to claim 1, wherein
   the cable include a plurality of types of sub cables, and
   the types of the sub cables are selected at least in accordance with at least a type of the end effector.

4. The robot according to claim 1, wherein
   the coupling portion is disposed on the base.

5. The robot according to claim 1, wherein
the coupling portion is disposed on the revolving portion rotatably connected to the base.

6. The robot according to claim 1, wherein
the coupling portion is disposed on the upper arm rotatably connected to the lower arm.

7. A method of manufacturing a robot, comprising:
preparing a robot body and an end effector, the robot body including a base, a revolving portion, a lower arm, an upper arm, a first wrist portion, a second wrist portion, and a third wrist portion which are connected in this order, the end effector being connected to the third wrist portion;
preparing a cable composed of a plurality of sub cables;
arranging the plurality of sub cables along the robot body;
providing a plurality of coupling portions on the robot body, each of which couples one sub cable and an adjacent sub cable among the plurality of sub cables together, the plurality of coupling portions including a first module provided on the upper arm, a second module provided on the second wrist portion, a first connector, a second connector directly connected to the first connector, a third connector, a fourth connector, a fifth connector, and a sixth connector, at least one of the first module and the second module being selected from a plurality of types of modules in accordance with a type of the cable to be coupled with the at least one of the first module and the second module, the at least one of the first module and the second module including a device corresponding to at least the type of the cable to be coupled with the module;
connecting the sub cables via the corresponding coupling portion such that a first sub cable and a second sub cable provided between the base and the upper arm are coupled in the first module, a third sub cable and a fourth sub cable connected at the second wrist portion are coupled in the second module, two sub cables provided between the first module and the second module are directly coupled in the first connector and the second connector without using a module, the first sub cable is connected to the third connector, the second sub cable is connected to the fourth connector, the third sub cable is connected to the second module via the fifth connector, and the fourth sub cable is connected to the second module via the sixth connector, the third connector and the fourth connector are configured to:
connect via the first module in a first connection arrangement; and
directly connect to each other without the first module in a second connection arrangement; and
connecting the end effector to the cable.

8. The method of manufacturing a robot according to claim 7, further comprising selecting the sub cables from a plurality of types of the sub cables at least in accordance with a type of the end effector.

9. A robot comprising:
a robot body including a base, a revolving portion, a lower arm, an upper arm, a first wrist portion, a second wrist portion, and a third wrist portion which are connected in this order;
an end effector connected to the third wrist portion;
a cable composed of a plurality of sub cables, the cable being arranged along the robot body and connected to the end effector; and
means for together coupling one sub cable and an adjacent sub cable of the sub cables, the means for coupling being provided between the one and adjacent sub cables, the means for coupling comprising:
a first module provided on the upper arm, a first sub cable and a second sub cable provided between the base and the upper arm being coupled in the first module;
a second module provided on the second wrist portion, a third sub cable and a fourth sub cable connected at the second wrist portion being coupled in the second module;
a first connector and a second connector directly connected to the first connector in which two sub cables provided between the first module and the second module are coupled without using a module;
a third connector connected to the first sub cable;
a fourth connector connected to the second sub cable;
a fifth connector via which the third sub cable is connected to the second module; and
a sixth connector via which the fourth sub cable is connected to the second module,
wherein at least one of the first module and the second module is selected from a plurality of types of modules in accordance with a type of the cable to be coupled with the at least one of the first module and the second module,
wherein the at least one of the first module and the second module includes a device corresponding to the type of the cable to be coupled with the at least one of the first module and the second module, and
wherein the third connector and the fourth connector are configured to:
connect via the first module in a first connection arrangement; and
directly connect to each other without the first module in a second connection arrangement.

* * * * *